Sept. 6, 1932.　　　H. W. SIMPSON　　　1,875,767
TRACTOR PULLEY
Filed Sept. 8, 1930　　　2 Sheets-Sheet 1

Sept. 6, 1932.   H. W. SIMPSON   1,875,767
TRACTOR PULLEY
Filed Sept. 8, 1930   2 Sheets-Sheet 2

INVENTOR.
H. W. Simpson
BY
ATTORNEY.

Witness.
C. C. McRae

Patented Sept. 6, 1932

1,875,767

UNITED STATES PATENT OFFICE

HOWARD W. SIMPSON, OF DEARBORN, MICHIGAN, ASSIGNOR TO FORD MOTOR COMPANY, OF DEARBORN, MICHIGAN, A CORPORATION OF DELAWARE

TRACTOR PULLEY

Application filed September 8, 1930. Serial No. 480,364.

The object of my invention is to provide a tractor pulley of simple, durable and inexpensive construction.

A further object of my invention is to provide a tractor pulley especially adapted for use as an accessory to the Fordson type tractor, my improved pulley being readily installed on such tractors with very little trouble. It is well known that the pulleys supplied by the makers of the above mentioned type of tractors are difficult to assemble thereto by the ordinary user. One of the tractor rear driving wheels must be removed which, due to its great weight, is a considerable job, before the pulley mechanism can be installed on the transmission. This is also true of all other pulleys for use on this type of tractor of which the applicant is familiar. Due to the proximity of the pulley to the inner face of the tractor wheel and to the necessity of supporting the driving gear a considerable distance inside of the transmisison case, this inconvenience has not heretofore been overcome.

In my improved device a construction is provided which allows the pulley and driving gear mechanism to be readily installed on the transmisison without removing any part of the tractor so that very little time and labor are required in the installation of the device. This feature is of special importance for the commercializing of my pulley structure as it reduces the cost of the assembled pulley a considerable amount.

Still a further object of my invention is to provide a tractor pulley which may be operably engaged by the driver of the tractor so as to be driven by the tractor motor, or which may be disengaged by the actuation of a lever so that the pulley will be inoperative while the tractor is being used for other purposes.

Still further, resilient means are provided whereby the pulley operating lever will be held in either its engaged or disengaged positions so that accidental operation of the device is prevented.

Still a further object of my invention is to provide a housing for supporting the pulley driving gear which extends into the tractor transmission case, which housing is of a substantially inverted U shaped cross section. The advantages of such housing are that it allows oil to be thrown up into the pulley housing by the engine flywheel so that the pulley bearings are better lubricated. Further, this housing allows the shifting lever and clutch device to be assembled through the open portion of the U section thus eliminating the necessity for a special cap or plate to hold the shifter in the housing.

With these and other objects in view, my invention consists in the arrangement, construction and combination of the various parts of my improved device as described in the specification, claimed in my claims, and illustrated in the accompanying drawings, in which:

Figure 4 shows a sectional view taken on the line 4—4 of Figure 2, parts being broken away to better illustrate the construction.

Figure 1:
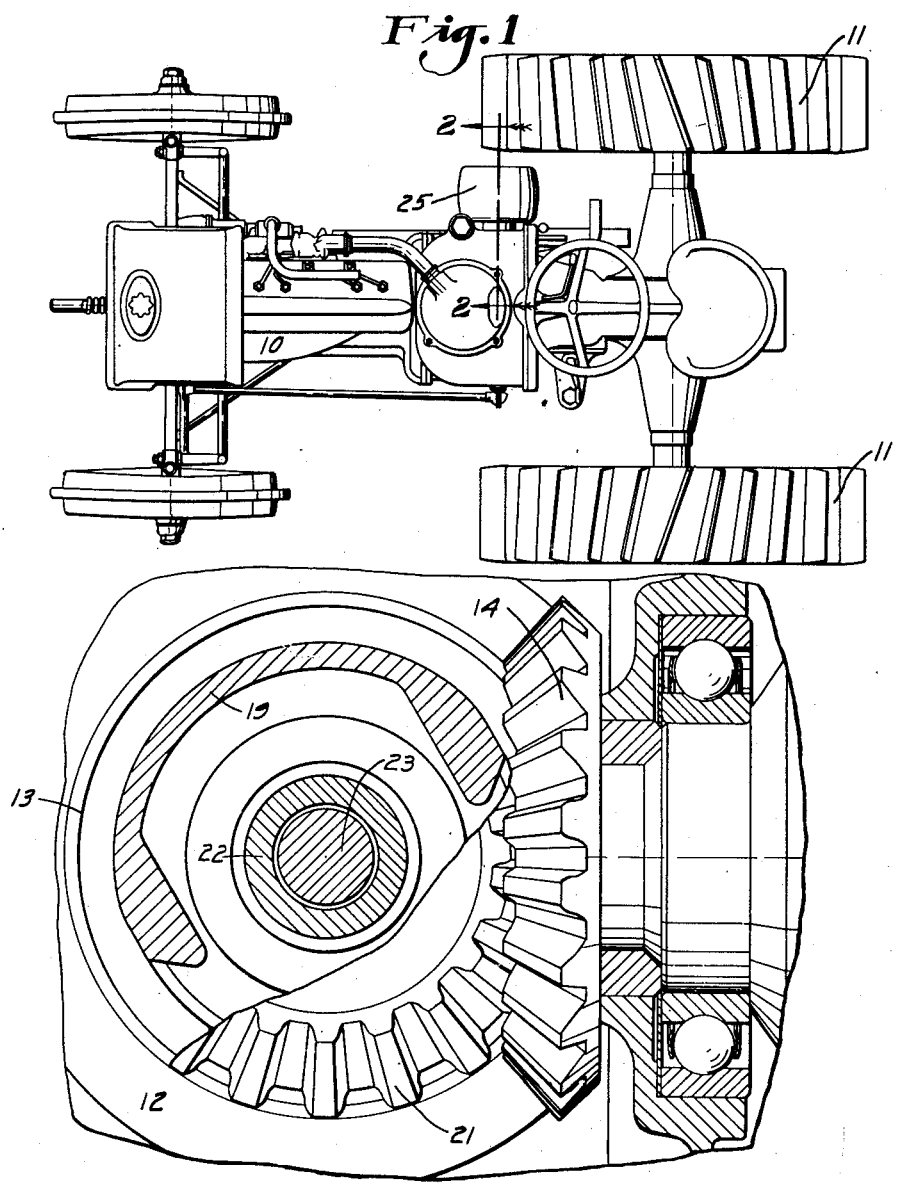
Figure 1 shows a plan view of a Fordson tractor having my improved pulley installed thereon.

Referring to the accompanying drawings, I have used the reference numeral 10 to indicate generally a Fordson tractor. My improved drive pulley is secured to one side of the transmission housing 12 just inside of the rear wheels 11 in the conventional manner, a circular opening 13 being provided in the transmission housing by the makers of this tractor for securing such a pulley thereto. A bevel gear 14 is mounted in the transmission housing and is fastened to the driving shaft of the transmission, which gear drives my improved pulley.

I have provided a tubular housing 15 having an annular flange 16 formed integrally therewith, which flange is fastened over the transmission opening 13 by a plurality of bolts 17. The housing 15 is of circular section and projects outwardly from the transmission a considerable distance where a ball bearing 18 is mounted in the end thereof. A projection 19 of inverted U shaped section extends inwardly from the flange 17 through the opening 13 where a second ball bearing 20 is mounted therein aligned with the opening 13 and bearing 18.

A bevel gear 21 which is in constant mesh with the gear 14 is formed integrally with a sleeve 22, this sleeve being mounted in the ball bearing 20 and extending outwardly to position adjacent to the flange 16. The bore of the sleeve 22 rotatably receives the inner end of a pulley shaft 23 while the outer end of this shaft is rotatably mounted by the ball bearing 18. Thus, the shaft 23 extends longitudinally through the housing and is being rotatably mounted therein by the ball bearing 18 and the sleeve 22. A nut 41 is provided on the inner end of the shaft 23 which secures the sleeve and shaft together.

The outer end of the shaft 23 projects through the bearing 18 and is provided with a splined portion 24 to which a pulley 25 is secured. This pulley is provided with a metal web which is secured to the splines 24 by means of a tapered split sleeve 26 adapted to co-act with these splines which sleeve is forced into a tapered central opening in the pulley by means of a nut 27 threaded on the end of the shaft 23. This is the conventional method of securing a pulley or the like to a splined shaft and forms no part of the invention disclosed herein.

From the foregoing it may be seen that when the gear 14 is rotating, which occurs at all times when the tractor engine is operating and the clutch is engaged, the gear 21 will also be driven to thereby rotate the sleeve 22 in the ball bearing 20. The shaft 23 being rotatably mounted in this sleeve is not driven thereby so that the pulley 25 remains stationary. I have provided a jaw clutch disposed between the sleeve 22 and the shaft 23, which may be manually operated to lock these two members together thereby driving the pulley from the gear 21 when it is desired to operate the drive pulley.

Figure 2:
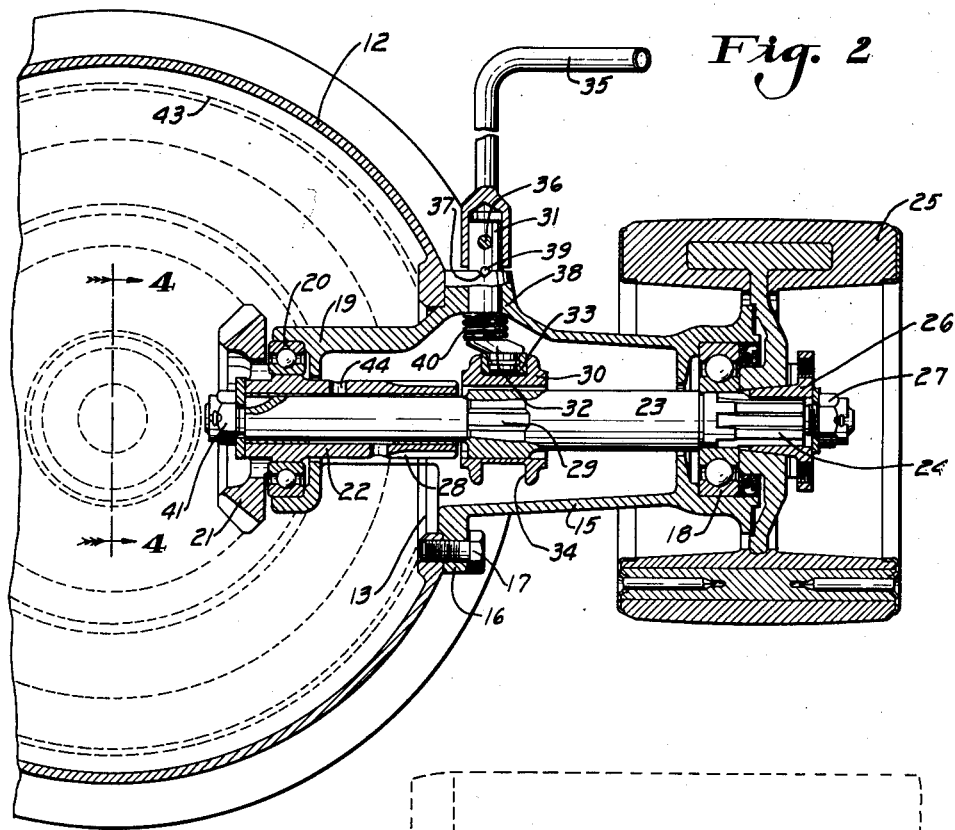
Figure 2 shows a sectional view taken on the line 2—2 of Figure 1.

The outer end of the sleeve 22 is provided with a plurality of splines 28 and the intermediate portion of the shaft 23 is provided with similar splines 29 therein. A clutch sleeve 30 is reciprocally mounted on the splines 29 in position to engage the splines 28 to thereby drive the shaft 23 in unison with the sleeve 22. Thus, when the sleeve 30 is in the position shown in Figure 2, there will be no driving connection between the gear 21 and the pulley 25. However, when the sleeve 30 is shifted inwardly the splines 28 and 29 will be locked to the clutch sleeve 30 thereby coupling the pulley 25 and gear 21 together.

Means are provided for operatively shifting the sleeve 30, which means consist of a vertical shaft 31 rotatably mounted in a bearing 38 cast in the housing 15, the shaft having a crank 32 formed integrally with its lower end within the housing 15. A shoe 33 is rotatably secured to the throw of this crank which shoe operates in a groove 34 formed in the periphery of the sleeve 30. When the shaft 31 is rotated through one-half a revolution the sleeve 30 will be reciprocated from one extreme position to the other.

An extension 35 is secured to the upper end of the shaft 31 by means of a pin 36, the upper portion of this extension being bent to form a handle so that the operator may not only turn the shaft 31 but may also lift it upwardly. I have provided a notch 37 machined in the upper end of the bearing 38 into which a pin 39 which extends through the shaft 31 may engage to hold the shaft 31 from rotating. A helical coil spring 40 is disposed around the lower end of the shaft 31 between the crank 32 and the bottom of the bearing 38 so that the shaft is resiliently urged at all times to position where the pin 39 bears against the upper end of the bearing 38. When the sleeve 30 is in a disengaged position, or that shown in Figure 2, the pin 39 will have entered the notch 37, thereby resiliently holding the device in the disengaged position. It will readily be seen that when the operator desires to shift the sleeve 30 he need only lift the handle 35 and rotate same.

Figure 3:
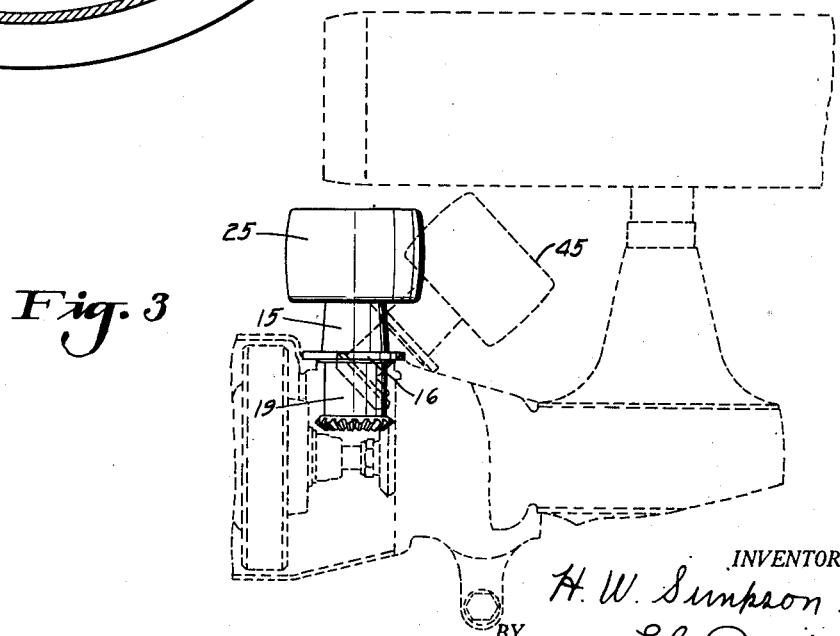
Figure 3 shows a top view of my device, illustrating the manner in which it is installed or removed from the tractor.

Referring to Figures 3 and 4, it will be seen that the projection 19, being of inverted U shaped cross section will allow the oil from the engine flywheel 43 to be thrown up into the housing 15 thereby lubricating the bearings 18 and 20 together with the sleeve 22 and clutch 30. Long life is thus assured for the bearing formed in the sleeve 22 by the constant flow of oil around this bearing. Oil holes 44 are provided in this sleeve which allows the splash from the flywheel to enter the bearing.

A most important feature of my device arises when it is desired to remove the pulley and housing from the tractor or to install the device on a tractor which is already in service. When this is desired, the bolts 17 are removed and the housing 15 rotated a quarter turn in the opening 13 so that the back of the U shaped projection 19 is toward the front of the tractor. The pulley 25 can now be moved rearwardly to the position shown by dotted lines 45 so that it clears the adjacent tractor wheel 11. The device may then be bodily removed from the tractor without removing the wheel therefrom. This is a very advantageous feature in the servicing of tractors and in the marketing of my improved device for the reason that removing the rear wheel of the tractor which was formerly necessary for the installation of a tractor pulley required a considerable amount of work and expense. Heretofore, in many cases tractor pulleys have not been purchased due to the cost and inconvenience of mounting the pulley on the tractor which objections are eliminated in my pulley structure.

Still a further advantage of my improved structure results because the shaft 31, spring 40, and splined sleeve 30 may be assembled through the U shaped member 19 thus eliminating the necessity for a special cap or plate to hold these parts in the housing.

Some changes may be made in the arrangement, construction and combination of the various parts of my improved device without departing from the spirit of my invention and it is my intention to cover by my claims, such changes as may reasonably be included within the scope thereof.

I claim as my invention:

1. In a quick detachable tractor pulley, a housing adapted to be secured over an opening in said tractor, the outer end of said housing extending to position adjacent to one of the tractor wheels and the inner end thereof extending into said tractor, and a pulley rotatably mounted in the outer end of said housing, the inner end of said housing being of an inverted U shaped cross section so that the housing may be rotated slightly and then moved to position where the pulley will clear said tractor wheel when the unit is being removed from the tractor.

2. In a quick detachable tractor pulley, a tubular housing adapted to be secured over an opening in said tractor and extending to position adjacent to one of the tractor wheels, an inverted member of U shaped cross section formed integrally with the inner end of said housing and extending into said opening, a drive shaft rotatably mounted between the ends of said housing and inverted member, a gear arranged to drive the inner end of said shaft, an a pulley secured to the outer end of said shaft, the U shaped member being so proportioned that rotation of the housing substantially one-quarter of a revolution will allow the housing and pulley to be moved rearwardly to position where the pulley will clear the tractor wheel when the unit is being removed.

3. In a quick detachable tractor pulley, a tubular housing having a flange thereon adapted to be secured over an opening in the tractor transmission housing, a member of inverted U shaped section extending inwardly from said flange, a drive shaft rotatably mounted between the ends of said member and housing, means for operatively connecting said shaft to said tractor engine, and a pulley secured to the outer end of said shaft, said U shaped section permitting displacement of the housing in the rear direction to thereby allow said housing to clear the tractor wheel.

4. In a tractor pulley, a tubular housing secured over an opening in the tractor transmission, a U shaped integral member projecting inwardly from said housing through said opening, a sleeve rotatably mounted in the inner end of said member so as to be in constant driving connection with the tractor engine, a shaft rotatably mounted in said sleeve and in the outer end of said housing, a tractor pulley secured to the outer end of said shaft, a clutch arranged to operably connect said sleeve and shaft, and operating means extending upwardly through said housing to manually shift said clutch, said U shaped member being so proportioned that the operating means may be inserted into the housing therethrough to thereby more conveniently install said operating means.

HOWARD W. SIMPSON.